United States Patent [19]

Spinelli

[11] 4,391,362

[45] Jul. 5, 1983

[54] SPEED CONTROLLED INFEED CONVEYOR SYSTEM

[75] Inventor: Louis A. Spinelli, West Milford, N.J.

[73] Assignee: Nabisco Brands, Inc., Parsippany, N.J.

[21] Appl. No.: 234,680

[22] Filed: Feb. 17, 1981

[51] Int. Cl.³ .............................................. B65G 43/08
[52] U.S. Cl. ..................................... 198/855; 198/502; 250/202; 250/223 R; 318/313; 318/480
[58] Field of Search ............... 198/347, 502, 855, 856; 318/313, 480; 250/202, 223 R

[56] References Cited

U.S. PATENT DOCUMENTS

| 3,064,357 | 11/1962 | Butters | 198/502 X |
| 3,451,563 | 6/1969 | Luginbuhl | 414/330 |
| 3,576,248 | 4/1971 | Conley | 198/855 X |

FOREIGN PATENT DOCUMENTS 45-35589  11/1970  Japan ................................. 198/502

Primary Examiner—James L. Jones, Jr.
Assistant Examiner—Douglas D. Watts
Attorney, Agent, or Firm—Gerald Durstewitz

[57] ABSTRACT

A speed controlled conveyor system in which the motor driving an input conveyor is speed regulated to control the axial product pressure. This pressure is measured by the outward bowing of the column of articles as it moves along a downwardly curving chute connecting the conveyor and the loading device. A photocell arrangement measures the degree of displacement of the column and transmits a corrective electrical signal to a motor speed control device.

3 Claims, 3 Drawing Figures

LOW PRESSURE

HIGH PRESSURE

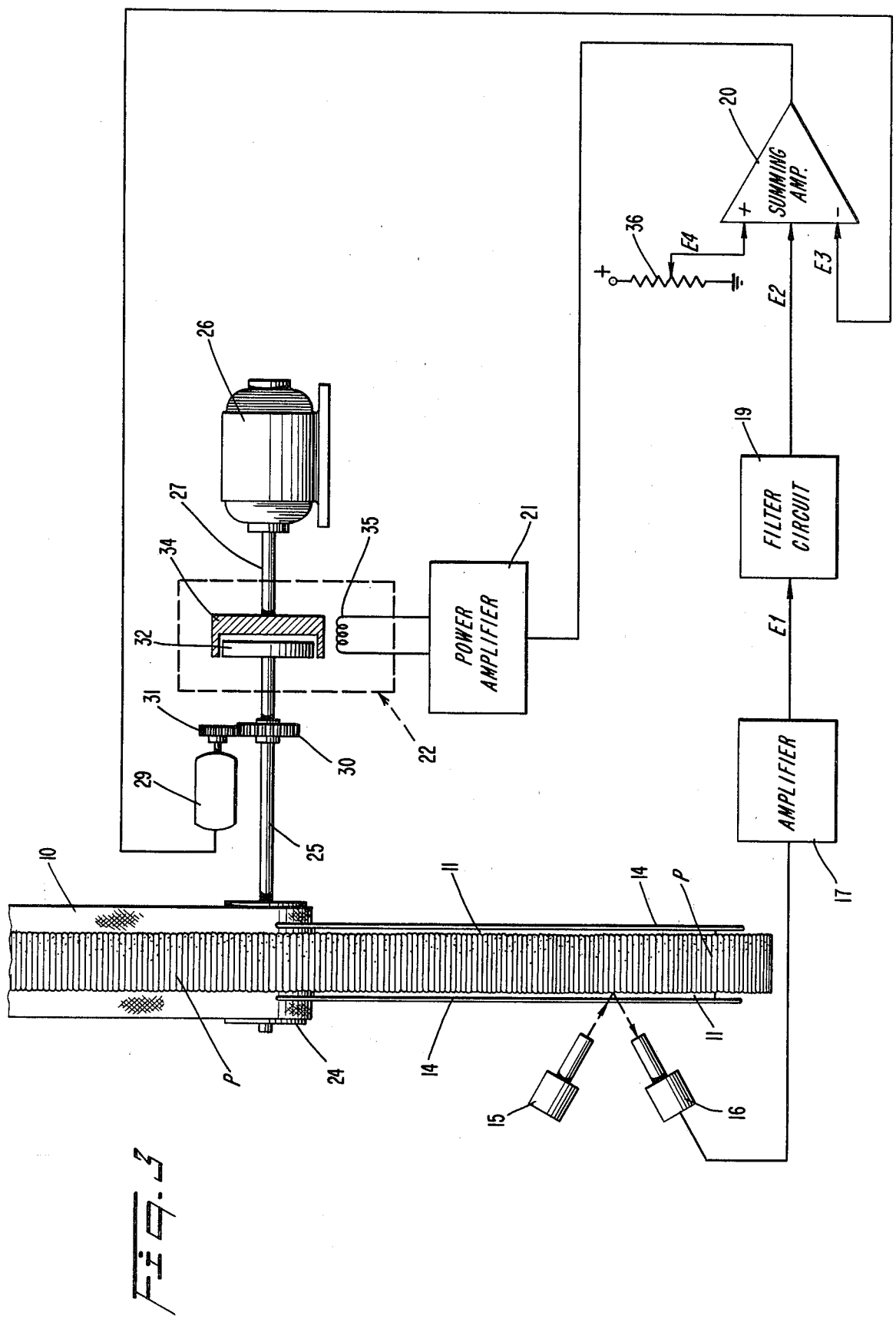

SPEED CONTROLLED INFEED CONVEYOR SYSTEM

BACKGROUND OF THE INVENTION

The present invention relates to conveyor systems and, more particularly, to speed controlled infeed conveyor systems.

In conveyor systems employing a conveyor belt that delivers a column of edge-stacked articles (for example, cookies or crackers) onto an infeed apron or chute of a product handling machine, a certain axial pressure is necessary within the column to hold the articles in the vertical on-edge position. The axial pressure is a function of the relationship between the speed of the conveyor and the rate at which the articles are removed from the apron or chute by the product handling device. When the conveyor is trying to deliver articles to its output end at a rate that exceeds the actual removal rate, the product pressure increases. As the pressure builds, the column of articles will arch upwardly. If the pressure continues to build, the arch eventually will collapse. Many product pieces will be strewn on the floor and others will fall back onto the conveying surface in random orientation and will jam the system.

Where the edge-stacked articles are of uniform thickness and that thickness does not vary from batch to batch of the product, the product pressure can be held at a constant value simply by setting the conveyor speed to correspond to the speed of operation of the product handling device. However, in the manufacturing of crackers and cookies, the thickness does vary from batch to batch. Such variations are due to slight changes in the character of the ingredients, in the quantities used, or in the bake time or temperature. These changes are minute but when hundreds of crackers are stacked on edge, the cumulative effect becomes significant. The speed of the conveyor systems transporting the baked goods from the ovens to the packaging machines, is geared to that of the conveyor that carries the pieces through the oven. Whether the baked goods of a particular batch are thicker or thinner than normal, they flow out of the oven at the same rate. But a specific number of thick crackers produce a longer column than the same number of thin crackers, and thereby product pressure is effected.

SUMMARY OF THE INVENTION

Accordingly, it is an object of the present invention to provide an improved speed controlled infeed conveyor system which automatically adjusts the conveyor speed in response to changes in axial product pressure.

The object of the invention is accomplished by providing a motor driven infeed conveyor feeding a column of articles onto a downwardly curved chute to an intermittent product receiving device, a photoelectric arrangement for producing an electrical signal proportioned to the displacement of the column from the curved chute in response to product pressure, and speed control apparatus responsive to the electrical signal for adjusting the speed of the input conveyor.

BRIEF DESCRIPTION OF THE DRAWINGS

A preferred embodiment of the invention has been chosen for purposes of illustration and description and are shown in the accompanying drawings, forming a part of the specification, wherein:

FIG. 3 is a schematic plan view of the system of FIGS. 1 and 2 showing the speed control apparatus for adjusting the speed of the input conveyor in response to changes in product pressure.

DESCRIPTION OF THE PREFERRED EMBODIMENT

Figure 1:
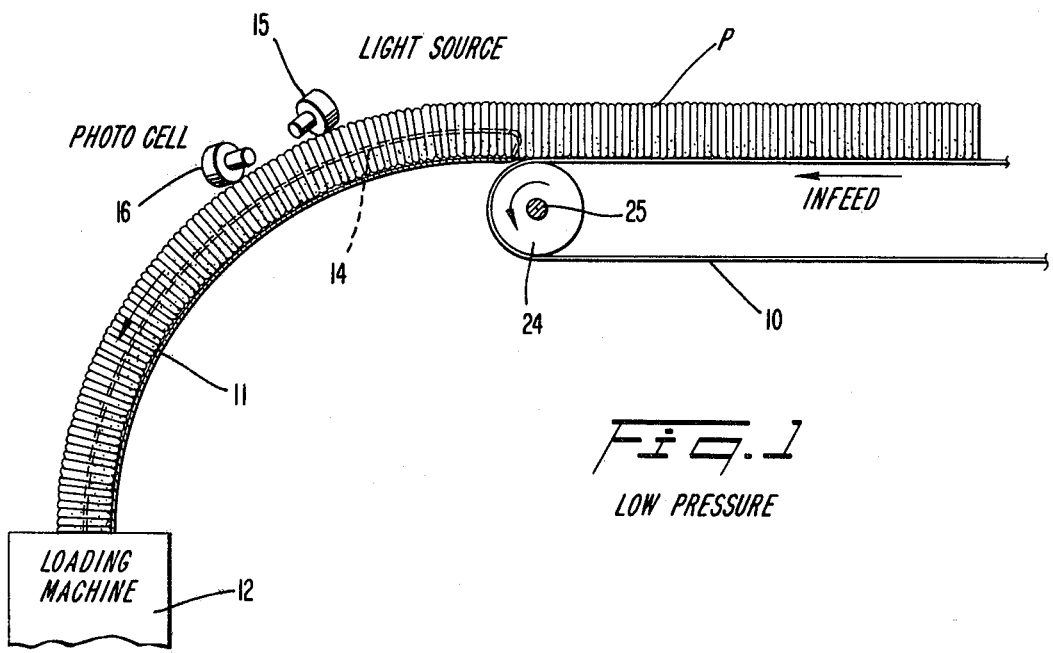
FIG. 1 is a schematic side elevational view of a conveyor system according to the present invention showing the position of the product column under a low product pressure condition.

Referring to the drawings in detail, there is shown a speed controlled infeed conveyor system according to the present invention in which an infeed conveyor 10 delivers a column of edge-stacked crackers P to a downwardly arcing chute 11. The crackers are intermittently removed from the bottom of the chute 11 by a package loading device 12. The loading device includes a reciprocating arm (not shown) which removes a number of crackers from the column on each stroke. The device 12 may be designed so that different numbers of crackers are removed on subsequent strokes. Loading devices of this general type are shown in U.S. Pat. Nos. 3,338,370 and 3,451,563.

Figure 2:
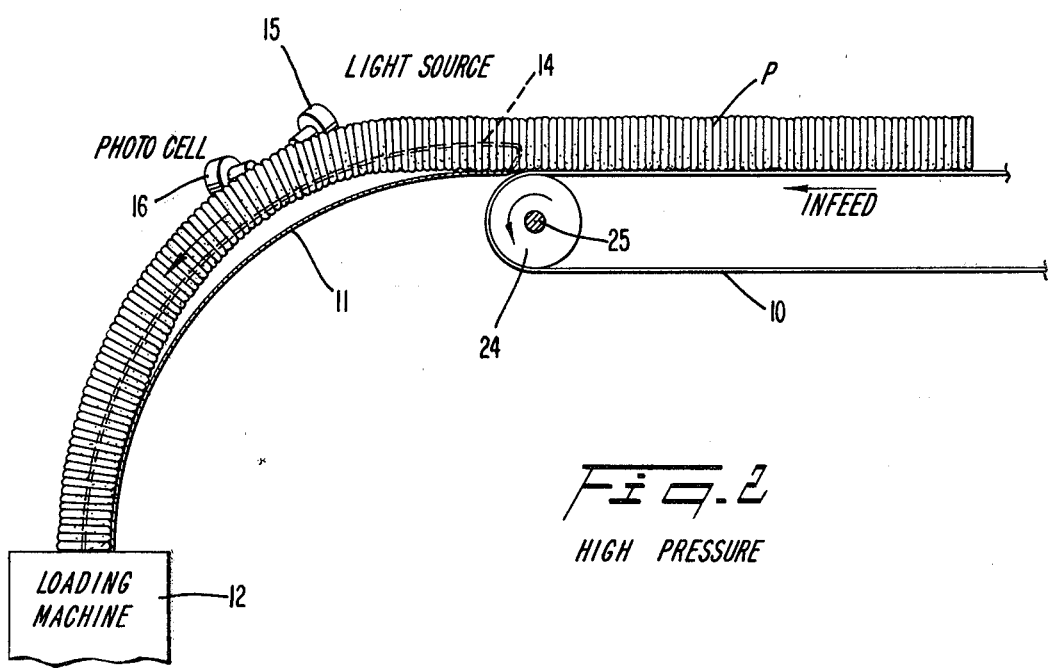
FIG. 2 is a schematic view similar to FIG. 1 showing the position of the product column under a high product pressure condition.

As seen in FIG. 1, when the axial product pressure is low, the edges of the crackers P are in engagement with the chute 11 throughout its length. As the axial product pressure increases, the column of crackers bows outwardly away from the chute as shown in FIG. 2. The chute is provided with side rails 14 to confine the column against lateral movement.

A light source 15 directs a beam of light perpendicular to the direction of the bowing movement of the column so that the column of crackers progressively intercepts the column of light as it bows outwardly. A photoelectric device 16 is positioned to receive the light which is reflected from the bowing column. As the column progressively intercepts the beam of light, the amount of light reflected increases proportionately. The photoelectric device 16 produces an electrical signal which varies in amplitude in proportion to the light level it receives.

Since the loading device 12 works in an intermittent manner and the input conveyor 10 operates continuously, the axial product pressure builds between product removing strokes and suddenly decreases when a group of articles is removed.

The output of the amplifier 17 ($E_1$) has a jagged waveform representing the instantaneous changes in the product pressure. This signal is passed through a filter circuit 19 to average out the short term signal variations and produce an output that represents the relationship of the rate of product input to the average rate of product output. The filtered signal ($E_2$) is fed into a summing amplifier 20 where it is added to a feed back signal $E_3$ which varies with the speed of the conveyor 10. The summing amplifier compares the sum of $E_2$ and $E_3$ with a reference voltage $E_4$ and produces an error signal when $E_2+E_3$ does not equal $E_4$. This error signal is used to adjust a power amplifier 21 that controls an eddy current clutch 22 in the drive mechanism for the infeed conveyor 10.

The conveyor 10 is driven by a roller 24 mounted on a shaft 25 that is connected to the output of the clutch 22. A constant speed motor 26 is connected to the input of the clutch 22 by a shaft 27. A tachometer 29 driven from the shaft 25 through gears 30 and 31 provides the feed back signal $E_3$.

The eddy current clutch consists of a circular plate 32 and a cup-shaped armature 34 which receives the plate 32. The armature is connected to the input shaft 27 and the plate is connected to the output shaft 25. The power amplifier 21 feeds a coil 35 in the clutch to generate a magnetic field. This field produces a magnetic circuit in the armature 34 which is completed by the plate 32. As the armature 34 rotates, the magnetic link between the plate and the armature produces a rotational force in the plate which varies in proportion to the output of the power amplifier 21.

The amplifier 21 is biased so that, when there is no error signal generated by the summing amplifier, the clutch 22 drives the conveyor 10 at a speed which produces sufficient product pressure to lift the column of crackers on the chute 11 to a position partially intercepting the column of light from the source 15. A potentiometer 36 connected to the summing amplifier is used to set the value of $E_4$ to equal the sum of the feedback signal $E_3$ and the $E_2$ signal produced by that degree of bowing of the column. The system will now automatically respond to any further outward bowing of the column by producing a negative error signal to slow the conveyor 10. Likewise, any decrease in the bow of the column will product a positive error signal to speed up the conveyor.

It will be seen from the foregoing that the present invention provides an improved speed controlled infeed conveyor system which automatically adjusts the conveyor speed in response to changes in axial product pressure.

I claim:

1. A speed controlled conveyor system for transporting a continuous column of abutting articles, said system comprising a generally horizontal infeed conveyor having an output end, a curved chute aligned with said output end and extending in a downward arc, a product handling device removing articles from the lower end of the chute, said chute being open on the side thereof facing upward and forward to permit the curved column of articles on the chute to bow outwardly when axial pressure within the column builds due to the infeed rate exceeding the removal rate, means for measuring the outward displacement of the curved column on the chute and producing a first electrical signal proportional to that displacement, a motor driving said infeed conveyor and speed control means responsive to the first signal for adjusting the speed of said motor, said means for measuring the displacement of said curved column including a light source directing a light beam so as to be progressively intercepted by the column as it bows outwardly, and a photocell for detecting the degree to which said light beam is intercepted by said column, said speed control means including a variable output magnetic clutch having an electromagnetic control coil, means producing a second electrical signal proportional to the speed of the input conveyor, and means for summing said first and second signals and producing a third signal proportional to the difference between a reference voltage and the sum of said first and second signals.

2. Apparatus according to claim 1 wherein said first signals is passed through a filter circuit to average out short-term variations and produce an output that represents the relationship of the rate of product input to the average rate of product output.

3. Apparatus according to claim 2 wherein said amplifier is biased to drive the conveyor at a speed to produce sufficient axial product pressure to lift the curved column into the light beam.

* * * * *